United States Patent
Shimizu

(10) Patent No.: US 9,541,259 B2
(45) Date of Patent: Jan. 10, 2017

(54) ILLUMINATION APPARATUS, AND LIQUID CRYSTAL DISPLAY APPARATUS AND TELEVISION RECEIVER APPARATUS PROVIDED WITH SAME

(71) Applicant: Sharp Kabushiki Kaisha, Osaka (JP)

(72) Inventor: Takaharu Shimizu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 165 days.

(21) Appl. No.: 14/375,216

(22) PCT Filed: Jan. 30, 2013

(86) PCT No.: PCT/JP2013/051950
§ 371 (c)(1),
(2) Date: Jul. 29, 2014

(87) PCT Pub. No.: WO2013/115200
PCT Pub. Date: Aug. 8, 2013

(65) Prior Publication Data
US 2015/0042891 A1    Feb. 12, 2015

(30) Foreign Application Priority Data
Feb. 1, 2012  (JP) ................. 2012-020126

(51) Int. Cl.
*G09F 13/04*    (2006.01)
*F21V 13/04*    (2006.01)
(Continued)

(52) U.S. Cl.
CPC .............. *F21V 13/04* (2013.01); *F21V 5/04* (2013.01); *G02F 1/133603* (2013.01);
(Continued)

(58) Field of Classification Search
CPC ........ F21V 1/04; F21V 5/04; G02F 1/133603; G02F 1/133611; G02F 1/133606; H04N 5/44; F21Y 2101/02
(Continued)

(56) References Cited

U.S. PATENT DOCUMENTS

| 8,876,311 | B2 * | 11/2014 | Yokotani | ............... F21V 3/0445 362/235 |
| 2009/0052192 | A1 | 2/2009 | Kokubo et al. | |
| 2012/0105764 | A1 * | 5/2012 | Yokota | ............. G02F 1/133603 349/61 |

FOREIGN PATENT DOCUMENTS

| JP | 2009-44016 A | 2/2009 |
| JP | 2010-165477 A | 7/2010 |

(Continued)

*Primary Examiner* — Karabi Guharay
*Assistant Examiner* — Jessica M Apenteng
(74) *Attorney, Agent, or Firm* — Chen Yoshimura LLP

(57) ABSTRACT

An illumination device (1) includes: a plurality of LEDs (5) that are the light sources, the LEDs being arranged in a row in a circular shape; and a diffusion lens (6) disposed on the light-emitting side of the LEDs (5) in order to diffuse light emitted by the LEDs (5), the diffusion lens (6) being disposed so as to follow an arrangement direction of the LEDs (5) to cover these LEDs. The degree of light diffusion of the diffusion lens (6) towards the direction forming a right angle with the arrangement direction of the plurality of LEDs (5) is larger than the degree of light diffusion towards the arrangement direction of the plurality of LEDs (5).

9 Claims, 7 Drawing Sheets

(51) Int. Cl.
*G02F 1/1335* (2006.01)
*F21V 5/04* (2006.01)
*H04N 5/44* (2011.01)
*F21Y 101/00* (2016.01)

(52) U.S. Cl.
CPC ......... *G02F 1/133611* (2013.01); *H04N 5/44* (2013.01); *F21Y 2101/00* (2013.01); *G02F 1/133606* (2013.01); *G02F 2001/133607* (2013.01)

(58) Field of Classification Search
USPC .......... 362/97.3, 97.1, 235, 600–634, 311.02
See application file for complete search history.

(56) References Cited

FOREIGN PATENT DOCUMENTS

| | | |
|---|---|---|
| JP | 2011-14831 A | 1/2011 |
| JP | 2012-4035 A | 1/2012 |

\* cited by examiner

ILLUMINATION APPARATUS, AND LIQUID CRYSTAL DISPLAY APPARATUS AND TELEVISION RECEIVER APPARATUS PROVIDED WITH SAME

TECHNICAL FIELD

The present invention relates to an illumination device that uses an LED as a light source, for example. The present invention further relates to a liquid crystal display device and a television receiver provided with this illumination device.

BACKGROUND ART

Fluorescent lamp illumination devices have traditionally been widely used in households, offices, and the like. Cold cathode fluorescent lamp illumination devices have also been used for liquid crystal display devices and television receivers. An ordinary fluorescent lamp such as a cold cathode fluorescent lamp is a light source in which an electrode is placed inside a glass tube where a prescribed gas has been sealed, and ultraviolet rays generated by electrical discharge are converted to visible light by hitting fluorescent material coated on the inner surface of this glass tube.

Meanwhile, the use of LED (light-emitting diode) illumination devices has been progressing in recent years due to the possibility of light illumination at a low voltage and high efficiency. Compared to fluorescent lamps and bulbs that use filament and the like, illumination devices using LEDs as a light source make it possible to reduce power consumption. A conventional illumination apparatus, which is one example of an illumination device that uses LEDs as a light source, is disclosed in Patent Document 1.

The illumination apparatus disclosed in Patent Document 1 has individual LED lenses that are elliptical in a cross-sectional view respectively provided on the light illumination side of a plurality of LEDs that are in a loop shape. The long axes of the respective LED lenses face the center of this loop shape. Accordingly, this conventional illumination apparatus widely emits light towards the center and the outside of this loop shape and has a uniform brightness.

RELATED ART DOCUMENT

Patent Document

Patent Document 1: Japanese Patent Application Laid-Open Publication No. 2012-4035

SUMMARY OF THE INVENTION

Problems to be Solved by the Invention

The conventional illumination device disclosed in Patent Document 1, however, requires a large number of LED lenses in order to evenly illuminate a wide area. This adds to the number of components and assembly steps, and leads to an increase in cost of the illumination device. There is also a risk that uneven brightness could occur between adjacent LED lenses.

Furthermore, when using a reflective sheet or the like to improve the usage efficiency of light, it is necessary to avoid the locations where the LEDs and LED lenses are attached when arranging the reflective sheet. This could decrease the workability of the installation of the reflective sheet. There are also various places where the reflective sheet is not provided, thus making it difficult to attain a large improvement in the usage efficiency of light.

The present invention was made in view of the above-mentioned points and aims at providing an illumination device that can lower costs, improve the usage efficiency of light, and reduce uneven brightness. The present invention further aims at providing a liquid crystal display device and a television receiver provided with this illumination device.

Means for Solving the Problems

To solve the above-mentioned problems, an illumination device of the present invention includes a plurality of light sources arranged in a row; and a diffusion lens that is disposed on a light-emitting side of the light sources in order to diffuse light emitted therefrom, the diffusion lens being disposed so as to follow an arrangement direction of the light sources to cover the plurality of these light sources, wherein a degree of light diffusion of the diffusion lens towards a right angle to the array direction of the plurality of light sources is larger than the degree of light diffusion towards the arrangement direction of the plurality of light sources.

With this configuration, the illumination device has the single diffusion lens for diffusing the light emitted from the respective plurality of light sources. In other words, the number of diffusion lenses in relation to the number of light sources is greatly reduced. The diffusion lens is also present between the adjacent light sources. Accordingly, uneven brightness that could occur between the adjacent light sources is suppressed.

In the illumination device having the configuration described above, the diffusion lens has a housing recess that covers and houses the light sources, and a curved surface that is across from the housing recess and substantially protrudes outwards along a light-emitting direction of the light sources, and in a cross-section at a right angle to the array direction of the plurality of light sources, the curved surface has substantially arced sections that protrude outwards, the substantially arced sections being respectively formed at two spots on the left and the right of a central axis line that extends in a direction normal to an emitting surface of the light sources.

With this configuration, the light emitted by the light sources refracts at the curved surface of the housing recess of the diffusion lens, passes through the diffusion lens, and then refracts again at the curved surface. The light is widely diffused by the curved surface via the substantially arced sections. In other words, the degree of light diffusion of the diffusion lens in the direction forming a right angle with the array direction of the plurality of light sources becomes relatively high.

In the illumination device having the configuration described above, in the cross-section at a right angle to the array direction of the plurality of light sources, the two substantially arced sections of the curved surface both have centers of curvature at locations that are equidistant from the emitting surface of the light sources and equidistant from the central axis extending in the direction normal to the emitting surface of the light sources, the substantially arced sections having the same radius.

With this configuration, the illumination device emits light in similar directions on both sides of the plane extending in the array direction of the plurality of light sources, in addition to the central axis (optical axis) that extends in the direction normal to the emitting surface of the light sources. Accordingly, the illumination device can uniformly illuminate the periphery of the light sources and the diffusion lens.

In the illumination device having the configuration described above, in the cross-section at a right angle to the array direction of the plurality of light sources, the two substantially arced sections of the curved surface both have centers of curvature that are different distances from the emitting surface of the light sources and/or different distances from the central axis extending in the direction normal to the emitting surface of the light sources.

With this configuration, the illumination device emits light in different directions on both sides of the plane extending in the array direction of the plurality of light sources, in addition to the central axis (optical axis) that extends in the direction normal to the emitting surface of the light sources. Accordingly, the differing brightness among both sides of the light sources and diffusion lens is useful at desired times.

In the illumination device having the configuration described above, the diffusion lens has a stray light recess that is adjacent to the housing recess and that faces the curved surface, the stray light recess receding towards the curved surface.

With this configuration, stray light that could occur due to reflection by the diffusion lens or the like is reflected by the stray light recess. Stray light reflected by the stray light recess is widely diffused via the curved surface and emitted.

In the illumination device having the configuration described above, a diffusion cover that diffuses light exiting from the diffusion lens is disposed on a light-exiting side of the diffusion lens.

With this configuration, the light emitted by the diffusion lens of the illumination device can be further diffused and illuminate a room, for example. Accordingly, the usage efficiency of light of the illumination device is improved.

In the illumination device having the configuration described above, a reflective sheet that reflects light emitted by the light sources is disposed on a side of the light sources opposite to the light-emitting side, the reflective sheet facing the light-emitting side of the light sources.

With this configuration, light from the light sources that hits the diffusion cover and reaches the side opposite to the light-emitting side of the light sources is reflected by the reflective sheet back towards the light-emitting side of the light sources, for example. Accordingly, the usage efficiency of light of the illumination device is improved. Furthermore, the number of diffusion lenses is relatively small, and thus the workability of installing the reflective sheet is improved.

In the illumination device having the configuration described above, the plurality of light sources are arranged in a circular shape, and the diffusion lens has a ring shape.

With this configuration, the number of the light sources and size of the diffusion lens in a circular-shaped illumination device is reduced.

In the illumination device having the configuration described above, the plurality of light sources are arranged in a straight line, and the diffusion lens has a bar shape.

With this configuration, the number of the light sources and size of the diffusion lens in a straight illumination device is reduced.

In the illumination device having the configuration described above, a plurality of pairs are provided, each of the pairs having the plurality of light sources and the diffusion lens that is shared among the plurality of light sources.

With this configuration, when it is necessary illuminate a relatively large area in the direction at a right angle to the array direction of the plurality of light sources, for example, the pairs of the plurality of light sources and the respective diffusion lenses is arranged in the direction at a right angle to the array direction of the plurality of light sources.

The present invention includes a liquid crystal display device and a television receiver having the illumination device with the configuration described above. With this configuration, the number of diffusion lenses to the number of light sources is greatly reduced in the liquid crystal display device and the television receiver, and uneven brightness is suppressed.

Effects of the Invention

According to the present invention, an illumination device that can decrease costs, improve the usage efficiency of light, and reduce uneven brightness can be provided. By providing this illumination device, it is possible to provide a liquid crystal display device and a television receiver that can lower costs and suitably display images and the like.

DETAILED DESCRIPTION OF EMBODIMENTS

Embodiments of the present invention will be described below with reference to FIGS. 1 to 13. An illumination device (indoor illumination apparatus) of Embodiments 1 to 5 in which an indoor ceiling surface serves as the installation surface, and an illumination device (backlight) for use with a liquid crystal display device of Embodiment 6 will be described as examples.

Figure 1:
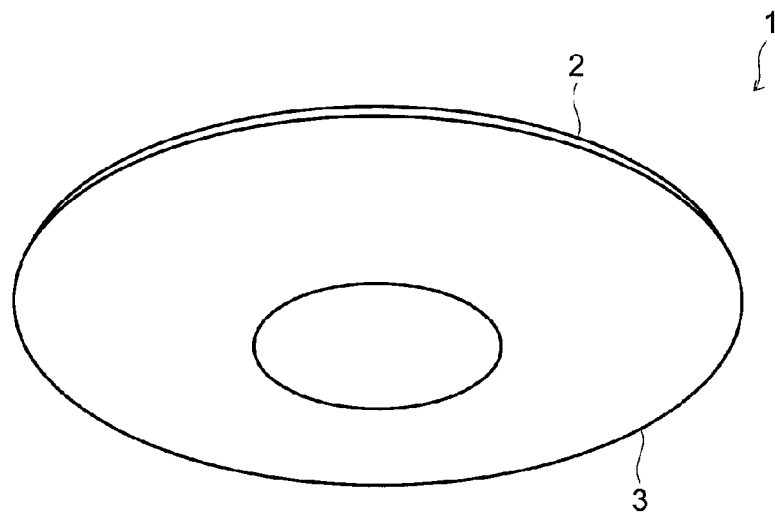
FIG. 1 is a complete perspective view of an illumination device of Embodiment 1 of the present invention as seen from below.

First, the general structure of the illumination device of Embodiment 1 of the present invention will be described using FIGS. 1 to 3. FIG. 1 is a complete perspective view from below the illumination device, FIG. 2 is a vertical cross-sectional view of a portion of the illumination device, and FIG. 3 is a bottom view of the illumination device when a diffusion cover has been removed.

Figure 2:
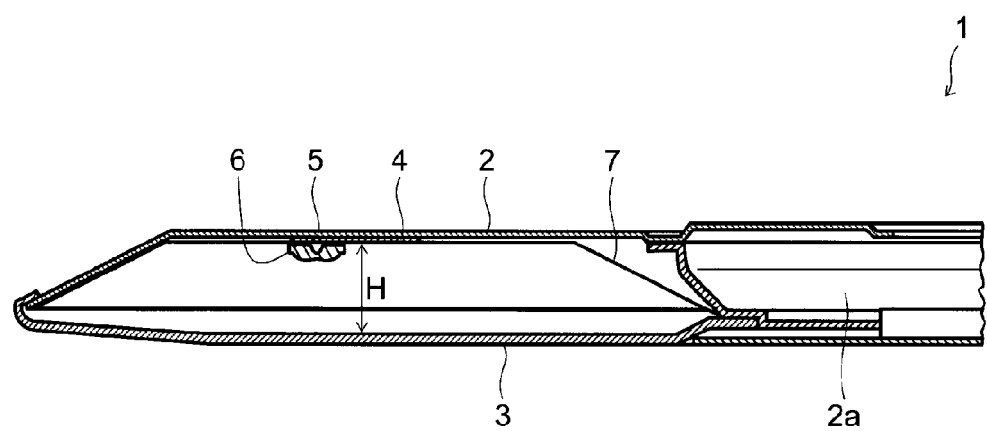
FIG. 2 is a vertical cross-sectional view of a portion of the illumination device according to Embodiment 1 of the present invention.
Figure 3:
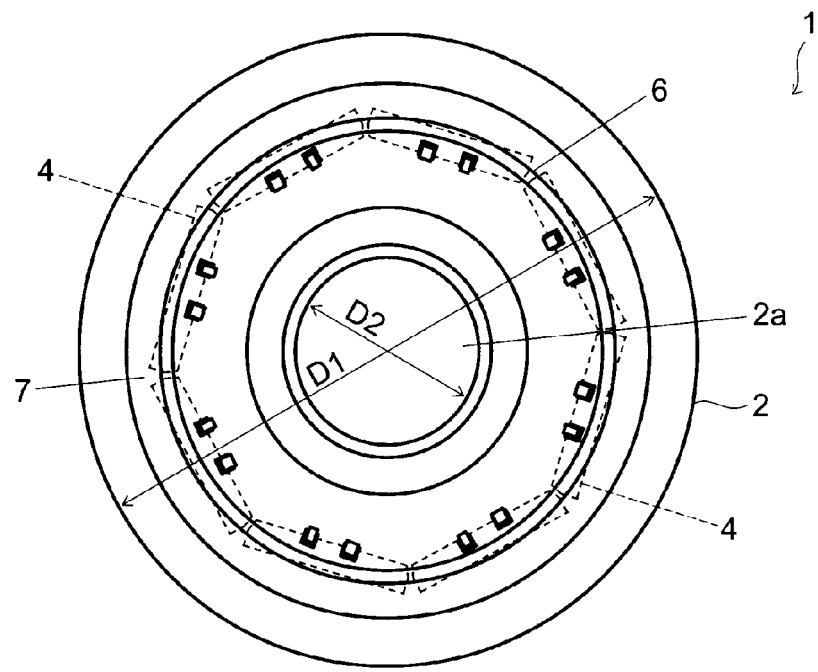
FIG. 3 is a bottom view of the illumination device according to Embodiment 1 of the present invention when a diffusion cover has been removed.

As shown in FIGS. 1 to 3, an illumination device 1 has a relatively thin disk shape that completely extends along an installation surface (ceiling surface). As shown in FIGS. 2 and 3, the illumination device 1 includes a base member 2, a diffusion cover 3, substrates 4, LEDs 5 that are the light source, a diffusion lens 6, and a reflective sheet 7.

The base member 2 is arranged above the illumination device 1 in the vicinity of the ceiling surface, which is the installation surface of the illumination device 1. The base member 2 has a round plate shape that faces downwards, the base member 2 having a diameter D1 of 600 mm, for example. The inside of the base member 2 holds the substrates 4 on which the respective LEDs 5 are mounted, the diffusion lens 6, and the reflective sheet 7. A power supply connector (not shown) is connected through the radial center of the base member 2. This power supply connector supplies power to the LEDs 5.

A projection 2a that projects downward is disposed in the center of the base member 2. The tip of the projection 2a has a diameter D2 of 200 mm, for example, and is near the inner surface center of the diffusion cover 3. A control section that has a power supply circuit, a control circuit, and the like (not shown) is disposed inside the projection 2a, and this control section is electrically connected to the power supply connector and the LEDs 5.

The diffusion cover 3 is arranged on the bottom of the illumination device 1 and faces downward towards the room, which is the target for illumination of the illumination device 1. The diffusion cover 3 has a circular shape with a diameter that is substantially the same as the outer diameter of the base member 2. The diffusion cover 3 fits into and is held by the periphery of the base member 2, and covers the entire surface of the base member 2 from below. The diffusion cover 3 is a PMMA (polymethyl methacrylate) resin with a diffusing material mixed in, for example, but may be a PC (polycarbonate resin), a PS (polystyrene) resin, or a PP (polypropylene) resin. The diffusion cover 3 is arranged on the light-emitting side of the diffusion lens 6 in order to diffuse light exiting the diffusion lens 6. The bottom surface of the diffusion cover 3 emits this light.

The substrates 4 have a substantially rectangular shape in a plan view and are attached to the bottom of the base member 2. The LED 5 is a white LED (light-emitting diode) that emits white light, for example, and a plurality of these LEDs 5 are mounted on the bottom surface of the respective substrates 4. The plurality of LEDs 5 are supplied with power through the power source connector and the control section, and radiate light towards the diffusion cover 3 below.

The diffusion lens 6 is arranged so as to cover the bottoms of the respective LEDs 5 in order to diffuse the light emitted by the LEDs 5. The diffusion lens 6 has a single ring shape in order to completely cover the plurality of LEDs 5.

The reflective sheet 7 is arranged above the LEDs 5 and below the substrates 4. The reflective sheet 7 is a sheet member having a substantially donut shape that covers the area from the outer radial side of the projection 2a of the base member 2 to the periphery of the base member 2. The portions corresponding to the LEDs 5 and substrates 4 are cut out. The reflective sheet 7 is a white PET foam (polyethylene terephthalate), for example. Light from the LEDs 5 that hits the inner surface of the diffusion cover 3 and reaches the base member 2 side is reflected by the reflective sheet 7 back towards the emitting side of the LEDs 5, for example.

Instead of the reflective sheet 7, a highly reflective surface may be formed by coating a silver material or the like on the bottom surface of the base member 2, for example, or a highly reflective surface may be formed by applying a mirror finish or the like on the bottom surface of the base member 2.

Figure 4:
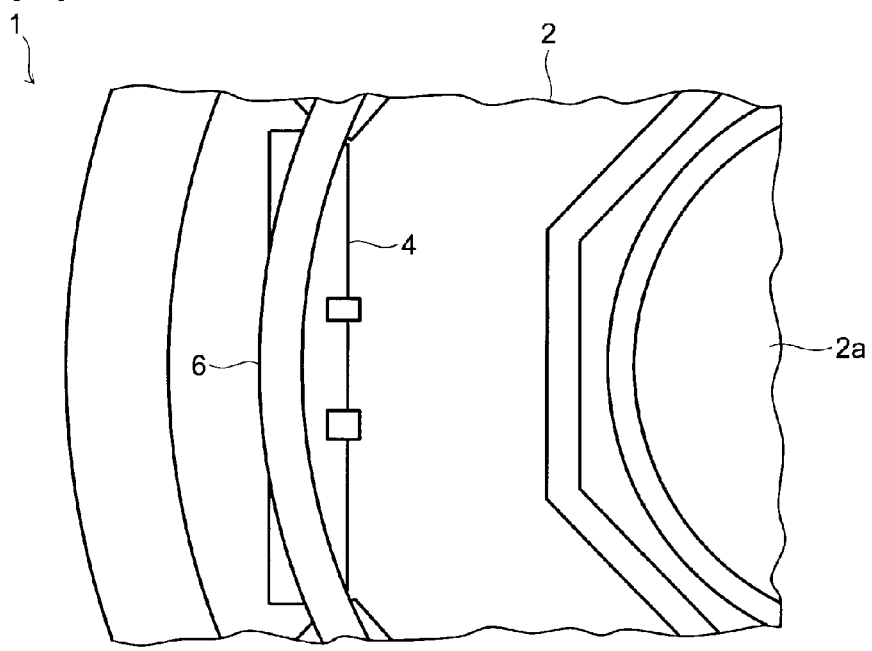
FIG. 4 is a magnified bottom view of a portion of the illumination device according to Embodiment 1 of the present invention when the diffusion cover has been removed.
Figure 5:
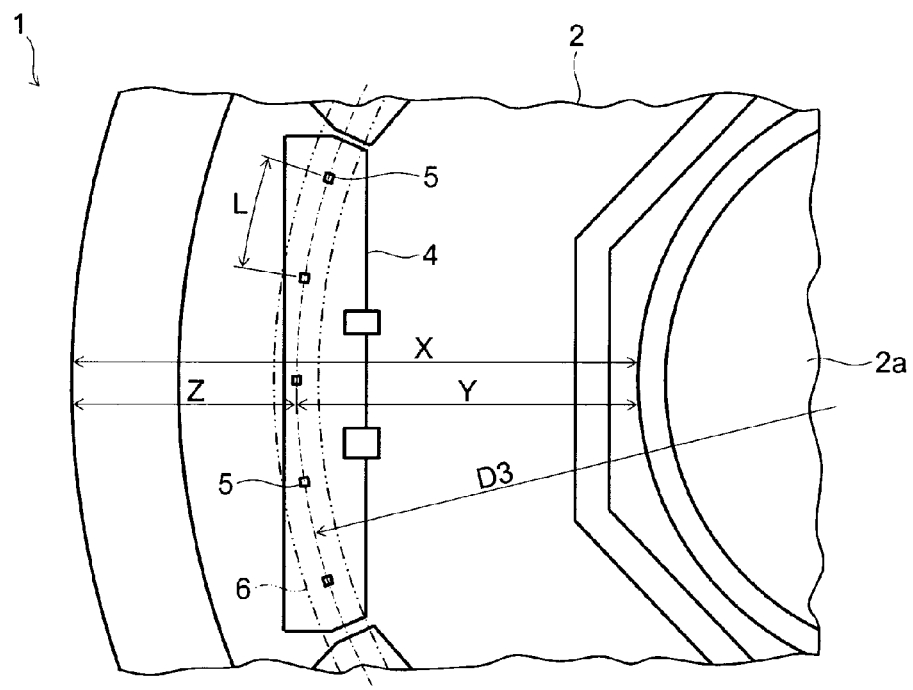
FIG. 5 is a magnified bottom view of the illumination device according to Embodiment 1 of the present invention when the diffusion cover and diffusion lens have been removed.
Figure 6:
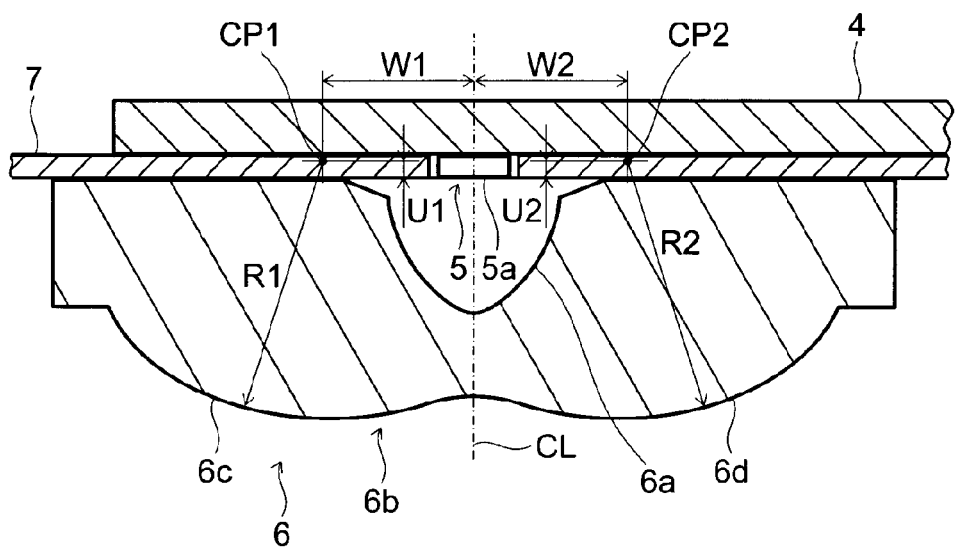
FIG. 6 is a vertical cross-sectional view where a portion of the LED and diffusion lens of the illumination device of Embodiment 1 of the present invention has been magnified.

Next, the specific configurations of the substrates 4, the LEDs 5, and the diffusion lens 6 of the illumination device 1 will be described using FIGS. 4 to 6 in addition to FIGS. 2 and 3. FIG. 4 is a magnified bottom view of a portion of the illumination device 1 when the diffusion cover 3 has been removed, FIG. 5 is a magnified bottom view of the illumination device 1 when the diffusion cover 3 and diffusion lens 6 have been removed, and FIG. 6 is a vertical cross-sectional view where a portion of the LEDs 5 and the diffusion lens 6 has been magnified. In FIGS. 4 and 5 the depiction of the reflective sheet 7 has been omitted. In FIG. 6, the left shows the outer radial side (periphery) of the illumination device 1, and the right shows the inner radial side (center) of the illumination device 1.

As shown in FIG. 3, eight of the substrates 4 are arranged so as to form a substantially circular shape with the central axis of the circular base member 2 as the center, or more specifically, so as to form a regular octagon, for example. As shown in FIG. 5, the eight substrates 4 each hold five LEDs 5, for example. Approximately 40 of the LEDs 5 are arranged in a row so as to form a circular shape having the central axis of the circular base member 2 as the center thereof.

The arrangement circle of the plurality of LEDs 5 has a diameter D3 (see FIG. 5) of 420 mm, for example. In other words, in FIG. 5, a radial distance X from the periphery of the projection 2a to the periphery of the base member 2 is 200 mm, whereas a radial distance Y from the periphery of the projection 2a to the arrangement circle of the LEDs 5 is 110 mm, and a radial distance Z from the arrangement circle of the LEDs 5 to the periphery of the base member 2 is 90 mm. This results in a relation of distance Y>distance Z.

A gap L in the peripheral direction of LEDs 5 that are adjacent, among the respective plurality of LEDs 5 (see FIG. 5), is 33 mm, for example. In contrast, a distance H (see FIG. 2) from the substrates 4 to the diffusion cover 3 is set to be 26 mm, for example. In other words, the illumination device 1 is configured such that the gap L between the adjacent LEDs 5 and the distance H from the substrates 4 to the diffusion cover 3 is L/H≤1.3, for example.

As shown in FIG. 6, the diffusion lens 6 is arranged on the light-emitting side of the LEDs 5 and completely covers the LEDs 5. The diffusion lens 6 has a ring shape that extends in accordance with the array direction of the plurality of LEDs 5. The diffusion lens 6 is shared among the plurality of LEDs 5. The diffusion lens 6 is a PMMA (polymethyl methacrylate) resin with a diffusing material mixed in, for example, but may be a PC (polycarbonate resin), or a PS (polystyrene) resin.

The diffusion lens 6 has a housing recess 6a in the top thereof. The housing recess 6a has a size and shape that covers and houses all of the LEDs 5 together, and is formed in a looped trench shape, the central axis of which coincides with the diffusion lens 6. As shown in FIG. 6, the vertical cross-section of the housing recess 6a, which is parallel to the radial direction thereof, has a substantially parabolic shape or a substantially "U" shape that recedes downward from the top of the diffusion lens 6.

The bottom of the diffusion lens 6 is a curved surface 6b disposed on the outside of the emitting direction of the LEDs 5. The curved surface 6b faces the housing recess 6a, and as shown in FIG. 6 the vertical cross-section parallel to the radial direction substantially protrudes towards the outside of the emitting direction of the LEDs 5. The curved surface 6b is formed as a looped projection, the central axis of which coincides with the diffusion lens 6.

In the vertical cross-section parallel to the radial direction (the cross-section that forms a right angle to the array direction of the LEDs 5), the curved surface 6b of the diffusion lens 6 has two substantially arced sections 6c and 6d that protrude towards the outside of the emitting direction of the LEDs 5. In the vertical cross-section parallel to the radial direction, the substantially arced sections 6c and 6d are respectively formed on the left and right of a central axis CL (optical axis) that extends in a direction normal to an emitting surface 5a of the LEDs 5. The periphery of the central axis CL, which is between the substantially arced sections 6c and 6d of the curved surface 6b, recedes towards the LEDs 5.

With this configuration, the light emitted by the LEDs 5 refracts at the curved surface of the housing recess 6a of the diffusion lens 6, passes through the diffusion lens 6, and refracts again at the curved surface 6b. In the curved surface 6b, the light is widely diffused through the substantially arced sections 6c and 6d. In other words, the degree of light diffusion of the diffusion lens 6 in the direction forming a right angle with the array direction of the plurality of LEDs 5 (the direction parallel to the radial direction) can be made comparatively high.

As described above, the illumination device 1 includes the plurality of LEDs 5 arranged in a row in a circular shape, and the diffusion lens 6 that extends in a ring shape in accordance with the array direction of the plurality of LEDs 5 and that is shared by the plurality of LEDs 5. The diffusion lens 6 has a degree of light diffusion in a direction (the direction parallel to the radial direction) at a right angle to the array direction of the plurality of LEDs 5 that is high compared to the degree of light diffusion in the array direction of the plurality of LEDs 5. With this configuration, the illumination device 1 has the single diffusion lens 6 for diffusing the light emitted from the plurality of LEDs 5. In other words, the number of the diffusion lenses 6 with respect to the number of the LEDs 5 can be greatly reduced. The diffusion lens 6 is also present between the adjacent LEDs 5. Accordingly, it is possible to suppress uneven brightness that could occur between the adjacent LEDs 5.

In the vertical cross section parallel with the radial direction, the substantially arced section 6c of the curved surface 6b has a radius R1 extending to a center of curvature CP1, which is a distance U1 from the emitting surface 5a of the LEDs 5 and a distance W1 from the central axis CL (optical axis) extending in the direction normal to the emitting surface 5a of the LEDs 5. In the vertical cross section parallel to the radial direction, the substantially arced section 6d of the curved surface 6b has a radius R2 extending to a center of curvature CP2, which is a distance U2 from the emitting surface 5a of the LEDs 5 and a distance W2 from the central axis CL (optical axis) extending in the direction normal to the emitting surface 5a of the LEDs 5.

The distance U1 is equal to the distance U2, the distance W1 is equal to the distance W1, and the radius R1 is equal to the radius R2.

In this manner, in the vertical cross section parallel to the radial direction, the two substantially arced sections 6c and 6d of the curved surface 6b respectively have the centers of curvature CP1 and CP2 that are at the equal distances U1 and U2 from the emitting surface 5a of the LEDs 5 and at the equal distances W1 and W2 from the central axis CL (optical axis) extending in the direction normal to the emitting surface 5a of the LEDs 5. The radii R1 and R2 from the respective substantially arced sections 6c and 6d to the centers of curvature CP1 and CP2 are equal to each other. Due to this, the illumination device 1 can emit light in similar directions on both sides of the plane extending in the array direction of the plurality of LEDs 5, in addition to the central axis CL (optical axis) that extends in the direction normal to the emitting surface 5a of the LEDs 5. Accordingly, the illumination device 1 can evenly illuminate the periphery of the LEDs 5 and the diffusion lens 6.

The illumination device 1 has the diffusion cover 3 that diffuses the light emitted from the diffusion lens 6 arranged on the light-emitting side of the diffusion lens 6; therefore, the light emitted by the diffusion lens 6 can be further diffused and illuminate a room, for example. Accordingly, the usage efficiency of light of the illumination device 1 can be improved.

The illumination device 1 also has the reflective sheet 7, which reflects light emitted by the LEDs 5, arranged on the side opposite to the light emitting side of the LEDs 5; thus, light from the LEDs 5 that hits the diffusion cover 3 and reaches the side opposite to the light-emitting side of the LEDs 5 is reflected by the reflective sheet 7 back towards the emitting side of the LEDs 5, for example. Accordingly, the usage efficiency of light of the illumination device 1 can be improved. Furthermore, there is only one of the diffusion lenses 6, and thus it is possible to improve the workability of installing the reflective sheet 7.

A plurality of LEDs 5 are arranged in a circular shape and the diffusion lens 6 forms a ring shape, thereby making it possible to reduce the number of the LEDs 5 and the size of the diffusion lens 6 in the illumination device 1 having a circular shape.

In this manner, according to the embodiment of the present invention, the illumination device 1 that can decrease costs, improve the usage efficiency of light, and reduce uneven brightness can be provided.

Figure 7:
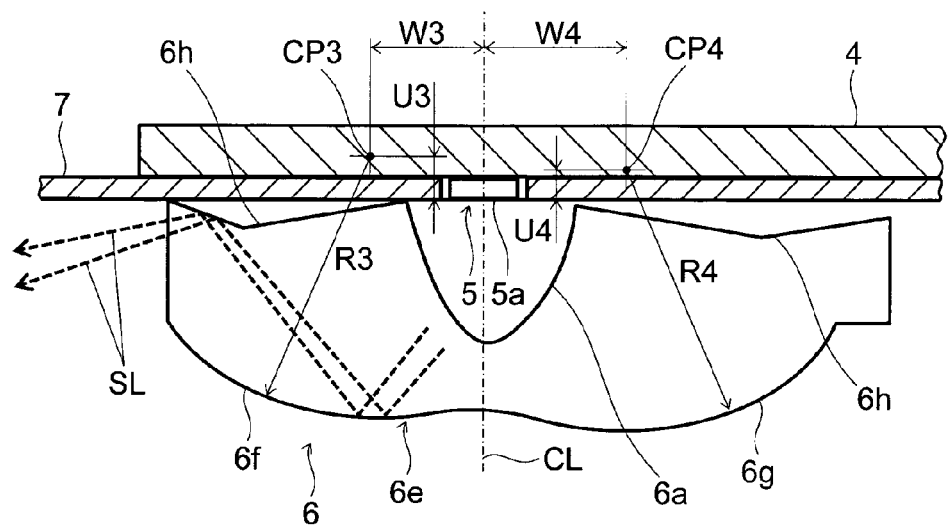
FIG. 7 is a vertical cross-sectional view where a portion of an LED and diffusion lens of the illumination device of Embodiment 2 of the present invention has been magnified.

Next, an illumination device according to Embodiment 2 of the present invention will be described with reference to FIG. 7. FIG. 7 is a vertical cross-sectional view where a portion of an LED and diffusion lens of the illumination device have been magnified. In FIG. 7, the left side shows the outer radial side (periphery) of the illumination device, and the right side shows the inner radial side (center) of the illumination device. In FIG. 7, the hatching pattern showing the cross-sectional cut ends of the diffusion lens has been omitted. The basic configuration of the present embodiment is the same as that described in Embodiment 1 with reference to FIGS. 1 to 6, and thus, components in common with Embodiment 1 are assigned the same reference characters, and drawings and descriptions thereof will be omitted.

In the illumination device 1 of Embodiment 2, as shown in FIG. 7 the bottom of a diffusion lens 6 has a curved surface 6e towards the outside in the emitting direction of LEDs 5. In the vertical cross-section parallel to the radial direction (the cross-section that forms a right angle to the array direction of the LEDs 5), the curved surface 6e of the diffusion lens 6 has two substantially arced sections 6f and 6g that protrude towards the outside of the emitting direction of the LEDs 5.

In the vertical cross section parallel to the radial direction, the substantially arced section 6f of the curved surface 6e has a radius R3 extending to a center of curvature CP3, which is a distance U3 from the emitting surface 5a of the LEDs 5 and a distance W3 from a central axis CL (optical axis) extending in the direction normal to the emitting surface 5a of the LEDs 5. In the vertical cross section parallel to the radial direction, the substantially arced section 6g of the curved surface 6e has a radius R4 extending to a center of curvature CP4, which is a distance U4 from the emitting surface 5a of the LEDs 5 and a distance W4 from the central axis CL (optical axis) extending in the direction normal to the emitting surface 5a of the LEDs 5.

Compared to the substantially arced section 6g on the inner radial side of the central axis CL (optical axis) that extends in a direction normal to the emitting surface 5a of the LEDs 5, the center of curvature CP3 near the substantially arced section 6f on the outer radial side is slightly closer to the central axis CL and slightly more above the emitting surface 5a. In other words, the distance U3 and the distance U4 are different from each other, and the distance W3 and the distance W4 are different from each other. The radius R3 and the radius R4 are approximately the same.

In this manner, in the vertical cross-section parallel to the radial direction, the centers of curvature CP3 and CP4 are located at the distances U3 and U4 where the substantially arced sections 6f and 6g both differ from the emitting surface 5a of the LEDs 5 and at the distances W3 and W4 where the substantially arced sections 6f and 6g both differ from the central axis CL (optical axis) that extends in a direction normal to the emitting surface 5a of the LEDs 5. Due to this, the illumination device 1 can emit light in different directions on both sides of the plane extending in the array direction of the plurality of LEDs 5, in addition to the central axis CL (optical axis) that extends in the direction normal to the emitting surface 5a of the LEDs 5. Accordingly, the differing brightness among the inner radial direction area and the outer radial direction area of the LEDs 5 and diffusion lens 6 is useful at desired times.

In particular, in the illumination device 1 according to Embodiment 2, the curved surface 6e of the diffusion lens 6 inclines towards the outer radial side; thus, it is possible to illuminate a large area in the outer radial direction as compared to the configuration in Embodiment 1.

Furthermore, the diffusion lens 6 is adjacent to the housing recess 6a and has stray light recesses 6h in locations facing the curved surface 6b. The stray light recesses 6h recede towards the curved surface 6b, in a manner similar to the housing recess 6a, and are disposed on the inner radial side and outer radial side of the housing recess 6a. With this configuration, as shown by the broken arrows in FIG. 7, stray light SL that could occur due to reflection by the diffusion lens 6 or the like is reflected by the stray light recesses 6h. The stray light SL that reflects at the stray light recesses 6h can be emitted by being widely diffused through the curved surface 6b.

Figure 8:
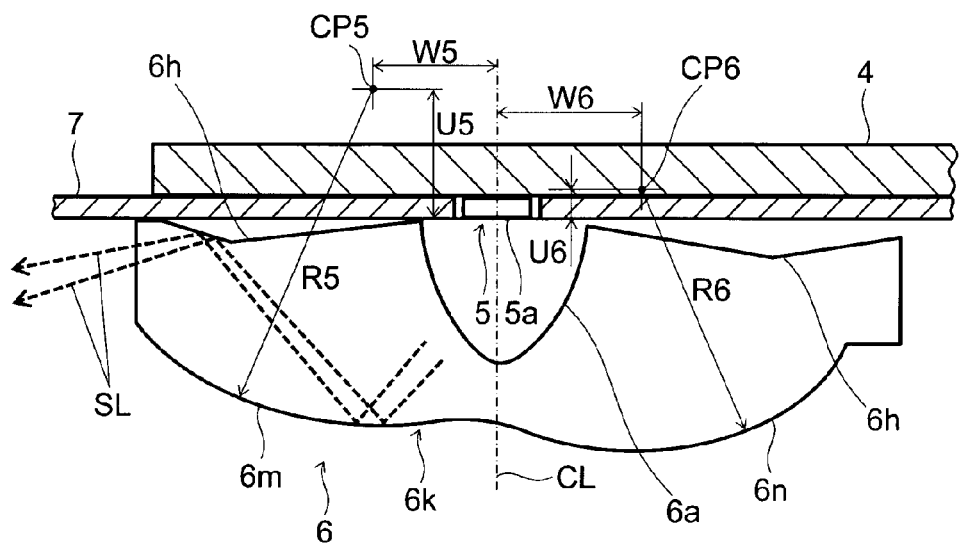
FIG. 8 is a vertical cross-sectional view where a portion of an LED and diffusion lens of the illumination device of Embodiment 3 of the present invention has been magnified.

Next, an illumination device according to Embodiment 3 of the present invention will be described with reference to FIG. 8. FIG. 8 is a vertical cross-sectional view where a portion of an LED and diffusion lens of the illumination device has been magnified. In FIG. 8, the left side shows the outer radial side (periphery) of the illumination device, and the right side shows the inner radial side (center) of the illumination device. In FIG. 8, the hatching pattern showing the cross-sectional cut ends of the diffusion lens has been omitted. The fundamental configuration of this embodiment is the same as Embodiments and 2, and thus, the constituting elements shared with these embodiments will be given the same reference characters, and drawings and detailed explanations thereof will be omitted.

In an illumination device 1 of Embodiment 3, as shown in FIG. 8, the bottom of a diffusion lens 6 has a curved surface 6k on outside of the emitting direction of LEDs 5. In the vertical cross-section parallel to the radial direction (the cross-section that forms a right angle to the array direction of the LEDs 5), the curved surface 6k of the diffusion lens 6 has two substantially arced sections 6m and 6n that protrude towards the outside of the emitting direction of the LED 5.

In the vertical cross section parallel to the radial direction, the substantially arced section 6m of the curved surface 6k has a radius R5 extending to a center of curvature CP5, which is a distance U5 from an emitting surface 5a of the LEDs 5 and a distance W5 from a central axis CL (optical axis) extending in the direction normal to the emitting surface 5a of the LEDs 5. In the vertical cross-section parallel to the radial direction, the substantially arced section 6n of the curved surface 6e has a radius R6 extending to a center of curvature CP6, which is a distance U6 from the emitting surface 5a of the LEDs 5 and a distance W6 from the central axis CL (optical axis) extending in the direction normal to the emitting surface 5a of the LEDs 5.

Compared to the substantially arced section 6n on the inner radial side of the central axis CL (optical axis) that extends in a direction normal to the emitting surface 5a of the LEDs 5, the center of curvature CP5 near the substantially arced section 6m on the outer radial side is slightly closer to the central axis CL and goes above substrates 4 from the emitting surface 5a. In other words, the distance U5 and the distance U6 are different from each other, and the distance W5 and the distance W6 are different from each other. The radius R5 is longer than the radius R6.

In this manner, in the vertical cross-section parallel to the radial direction, the centers of curvature CP5 and CP6 are located at the distances U5 and U6 where the substantially arced sections 6m and 6n both differ from the emitting surface 5a of the LEDs 5 and at the distances W5 and W6 where the substantially arced sections 6m and 6n both differ from the central axis CL (optical axis) that extends in a direction normal to the emitting surface 5a of the LEDs 5. Due to this, in a manner similar to Embodiment 2, the illumination device 1 emits light in different directions on both sides of the plane extending in the array direction of the plurality of LEDs 5, in addition to the central axis CL (optical axis) that extends in the direction normal to the emitting surface 5a of the LEDs 5. Accordingly, the differing brightness among the inner radial direction area and the outer radial direction area of the LEDs 5 and diffusion lens 6 is useful at desired times.

In particular, in the illumination device 1 according to Embodiment 3, the curved surface 6k of the diffusion lens 6 inclines further towards the outer radial side than in Embodiment 2; thus, it is possible to illuminate a larger area in the outer radial direction as compared to the configuration in Embodiment 2.

Figure 9:
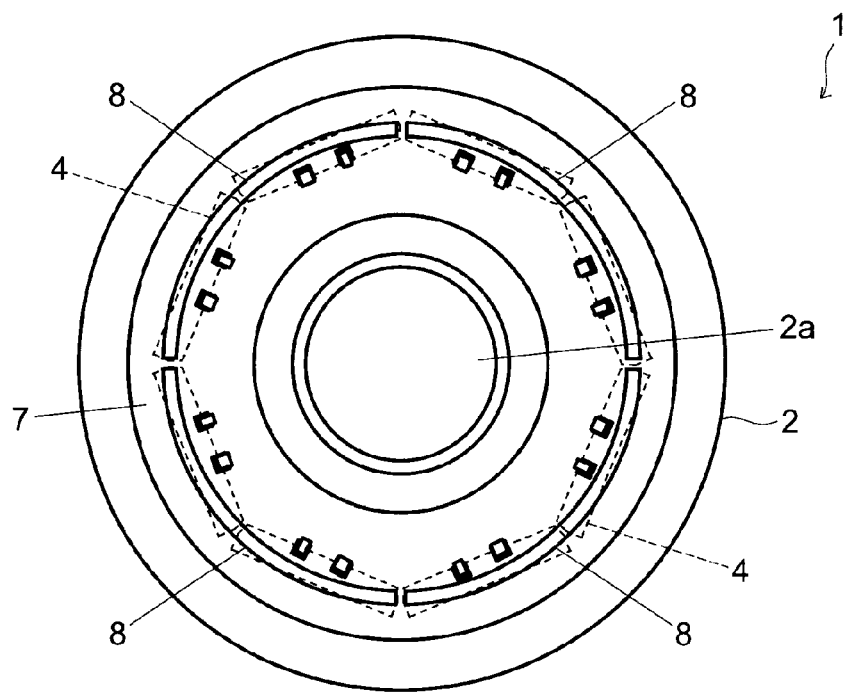
FIG. 9 is a bottom view of an illumination device according to Embodiment 4 when a diffusion cover has been removed.

Next, an illumination device according to Embodiment 4 of the present invention will be described with reference to FIG. 9. FIG. 9 is a bottom view of the illumination device when a diffusion cover is removed. The basic configuration of the present embodiment is the same as that described in Embodiment 1 with reference to FIGS. 1 to 6, and thus, components in common with Embodiment 1 are assigned the same reference characters, and drawings and descriptions thereof will be omitted.

An illumination device 1 according to Embodiment 4 is provided with four diffusion lenses 8, as shown in FIG. 9. The diffusion lenses 8 have an arc shape with a central angle of 90° extending in accordance with the circular array direction of a plurality of LEDs 5 (not shown in FIG. 9). Each of the diffusion lenses 8 covers a plurality of LEDs 5 across two substrates and is arranged on the light-emitting side of the respective LEDs 5. Each of the diffusion lenses 8 is also used to diffuse light emitted by the respective plurality of LEDs 5.

Even with such a configuration, the illumination device 1 can greatly reduce the number of diffusion lenses 8 to the number of the LEDs 5. The dimensional accuracy of the diffusion lenses 8 can be increased by configuring the diffusion lenses 8 in an arc shape and not a ring shape. Accordingly, the usage efficiency of light can be improved.

Figure 10:
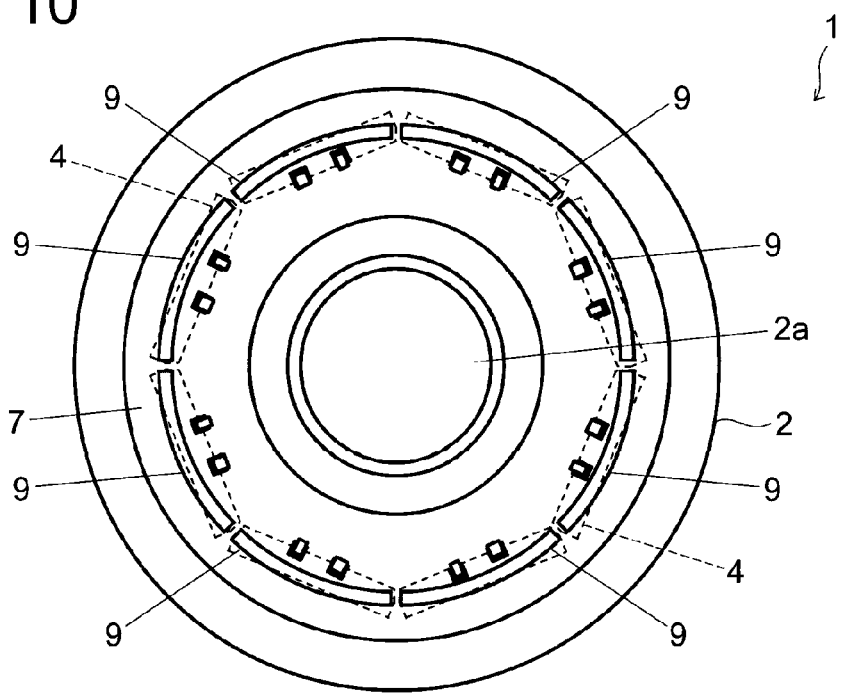
FIG. 10 is a bottom view of an illumination device according to Embodiment 5 when a diffusion cover has been removed.

Next, an illumination device according to Embodiment 5 of the present invention will be described with reference to FIG. 10. FIG. 10 is a bottom view of the illumination device when a diffusion cover is removed. The basic configuration of the present embodiment is the same as that described in Embodiment 1 with reference to FIGS. 1 to 6, and thus, components in common with Embodiment 1 are assigned the same reference characters, and drawings and descriptions thereof will be omitted.

An illumination device 1 according to Embodiment 5 is provided with eight diffusion lenses 9, as shown in FIG. 10. The diffusion lenses 9 have an arc shape with a central angle of 45° extending in accordance with the circular array direction of a plurality of LEDs 5 (not shown in FIG. 10). Each of the diffusion lenses 9 covers the plurality of LEDs 5 across one substrate and is arranged on the light-emitting side of the respective LEDs 5. Each of the diffusion lenses 9 is also used to diffuse light emitted by the respective plurality of LEDs 5.

Even with such a configuration, the illumination device 1 can greatly reduce the number of diffusion lenses 9 to the number of the LEDs 5. The dimensional accuracy of the diffusion lenses 9 can be increased by configuring the diffusion lenses 9 in an arc shape and not a ring shape. Accordingly, the usage efficiency of light can be improved.

Figure 11:
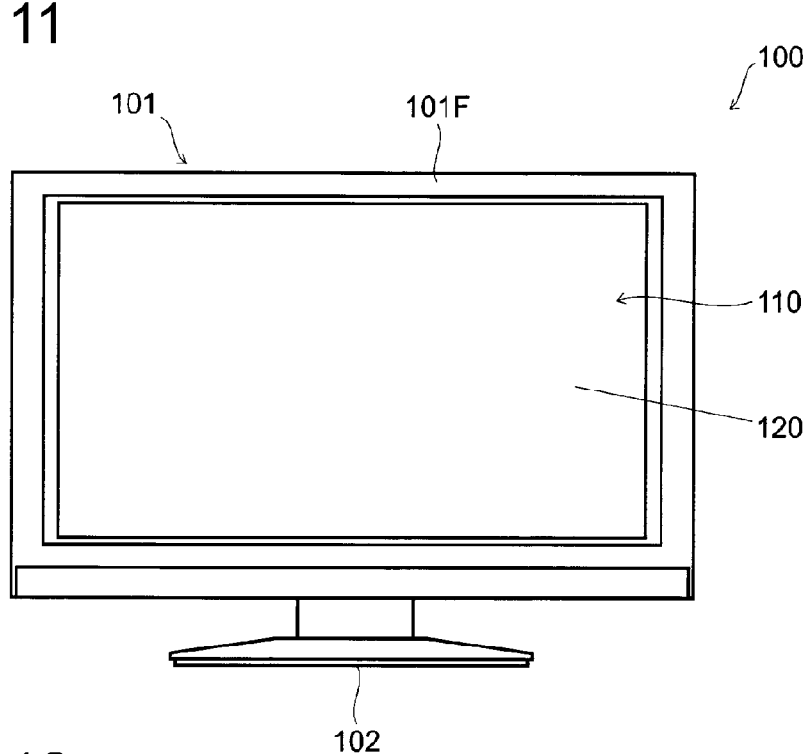
FIG. 11 is a front view of a television receiver according to Embodiment 6 of the present invention.

Next, a television receiver according to Embodiment 6 of the present invention will be explained using FIGS. 11 to 13. FIG. 11 is a front view of the television receiver, FIG. 12 is a horizontal top cross-sectional view of the television receiver, and FIG. 13 is an exploded perspective view of a liquid crystal display device of the television receiver.

A television receiver 100 according to Embodiment 6 has a liquid crystal display device 110 that uses liquid crystal for display of images and the like. As shown in FIGS. 11 and 12, the television receiver 100 has a substantially rectangular shape in a plan view that is longer in the left-and-right direction. The television receiver 100 has an external cover 101 that has a flat rectangular box shape. The external cover 101 is horizontally long and is supported by an upright stand 102.

The external cover 101 includes a front cover 101F and a rear cover 101R. The front cover 101F has a so-called frame shape that has a rectangular opening on the front side thereof. The rear cover 101R fits into the front cover 101F so as to cover the rear side of the front cover 101F, and this forms the rectangular box-shaped external cover 101. Although not shown, the external cover 101 has a plurality of ventilation holes that penetrate the inside and outside thereof. These ventilation holes make it possible for air to flow freely between the inside and the outside of the external cover 101.

Figure 12:
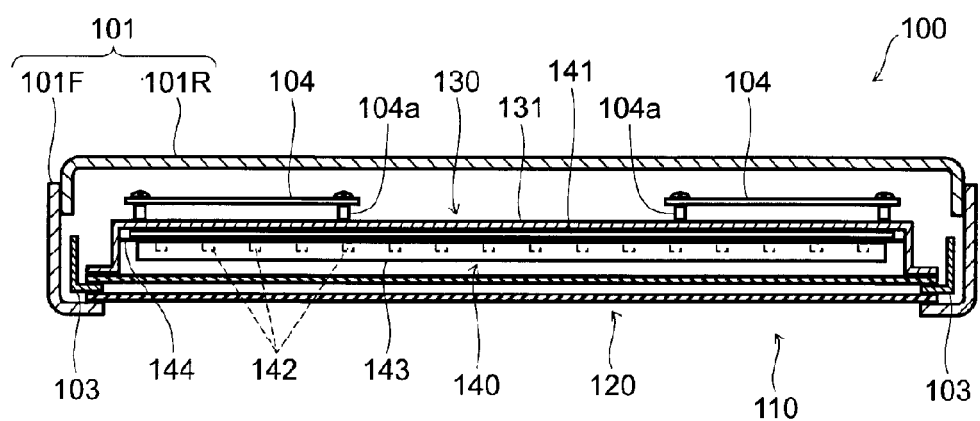
FIG. 12 is a horizontal top cross-sectional view of the television receiver according to Embodiment 6 of the present invention.
Figure 13:
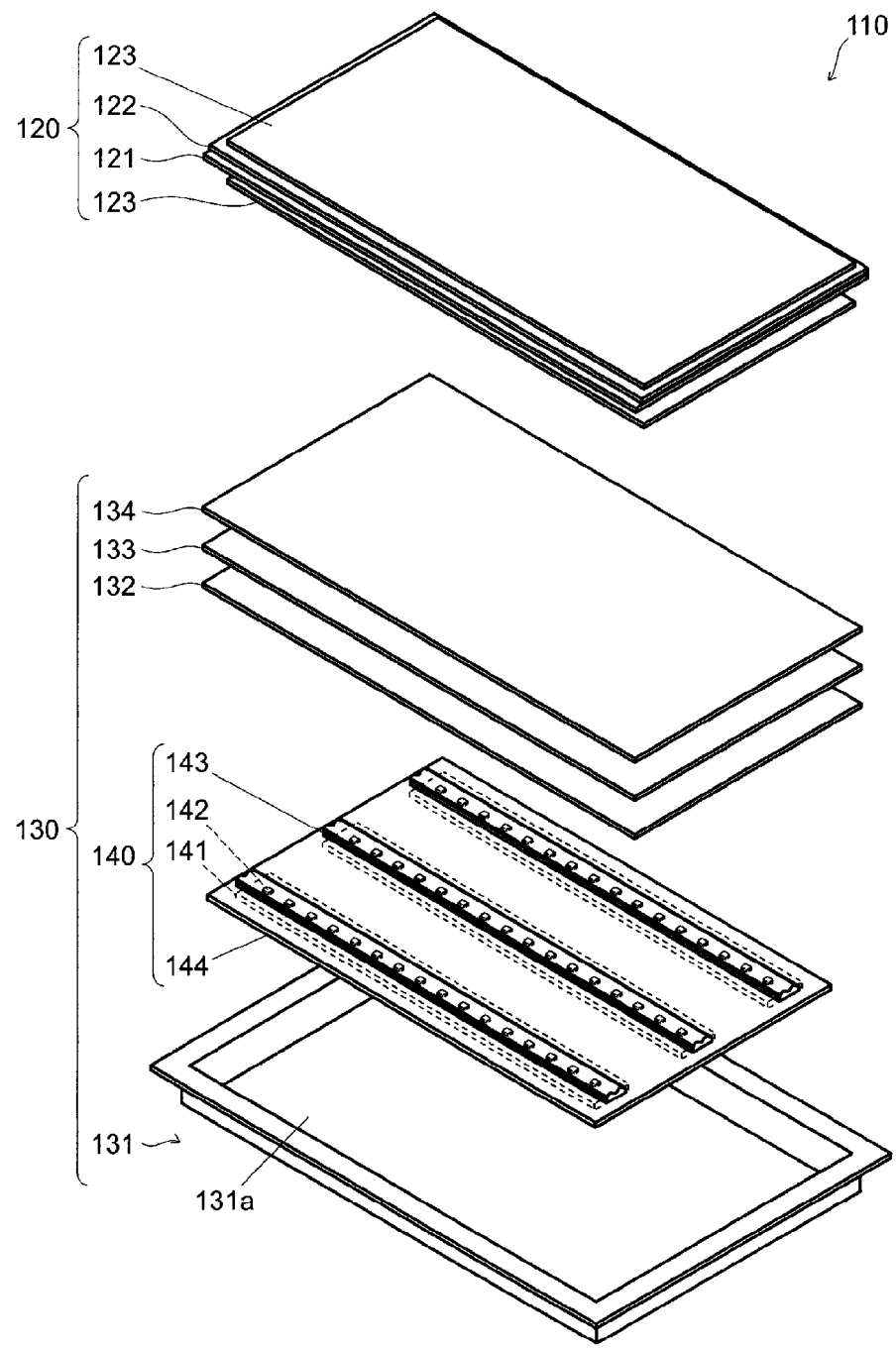
FIG. 13 is an exploded perspective view of a liquid crystal display device in the television receiver according to Embodiment 6 of the present invention.

As shown in FIG. 12, the inside of the external cover 101 includes the liquid crystal display device 110, panel holders 103, and circuit substrates 104.

The liquid crystal display device 110 is a display device that uses liquid crystal to display images and the like, and has a substantially rectangular shape in a plan view that is longer in the left-and-right direction. As shown in FIGS. 12 and 13, the liquid crystal display device 110 includes a liquid crystal display panel 120 and an illumination device 130, which is the backlight unit of the liquid crystal display panel 120.

The liquid crystal display panel 120 includes an active matrix substrate 121, a color filter substrate 122, and polarizing plates 123. The color filter substrate 122 is sometimes simply referred to as an opposite substrate.

The active matrix substrate 121 is disposed opposite to the color filter substrate 122 disposed on the display surface side of the liquid crystal display panel 120. The active matrix substrate 121 has TFTs (thin-film transistors) made of switching elements, pixel electrodes, and common electrodes on a prescribed surface of the active matrix substrate 121 (not shown). The pixel electrodes and the common electrodes are inter-digital electrodes that form pairs.

The active matrix substrate 121 and the color filter substrate 122 are respectively covered by alignment films (not shown) that have prescribed respective surfaces that orient the liquid crystal in a specific direction.

The active matrix substrate 121 and the color filter substrate 122 are bonded together by a sealing member (not shown) such that the prescribed surfaces thereof face each other. Liquid crystal is sandwiched between the active matrix substrate 121 and the color filter substrate 122, and is sealed in the space surrounded by the sealing member.

The polarizing plates 123 are bonded to prescribed surfaces that are the respective opposite surfaces of the active matrix substrate 121 and the color filter substrate 122 having the liquid crystal sealed therebetween. The polarizing plates 123 are sheets through which only light waves oscillating in a specific direction are allowed through, and the two polarizing plates 123 are respectively bonded such that the transmission axes thereof are offset by approximately 90.

The liquid crystal display panel 120 configured in this manner adjusts the orientation of the liquid crystal by an electric field generated between the pixel electrodes and the common electrodes in the active matrix substrate 121 on the basis of an image signal, thus changing the transmittance of light through the liquid crystal layer. The liquid crystal display panel 120 is of a transverse field type as described above, for example, and causes liquid crystal molecules to rotate within a plane parallel to the main substrate surface by generating an electric field parallel to the main surface of the active matrix substrate 121.

The illumination device 130 is a backlit unit for illuminating the liquid crystal display panel 120 from below and for generating this illumination light. The illumination device 130 is arranged on the rear surface side of the liquid crystal display panel 120. As shown in FIGS. 12 and 13, the illumination device 130 includes a chassis 131, a light-emitting module 140, a diffusion plate 132 that is equivalent to a diffusion cover, a prism sheet 133, and a lens sheet 134.

The chassis 131 has a box shape that is substantially rectangular in a plan view with an opening on the liquid crystal display panel 120 side (the front side of the television receiver 100). The chassis 131 houses the light-emitting module 140 therein, or namely, on an inner bottom surface 131a of the chassis 131.

The light-emitting module 140 emits light and is housed inside the chassis 131. The light-emitting module 140 includes substrates 141, a plurality of LEDs 142 that are the light source, diffusion lenses 143, and a reflective sheet 144.

The substrates 141 have a substantially rectangular shape in a plan view that stretches along the long-side direction of the chassis 131, and are attached to the inner bottom surface 131a of the chassis 131. Three of the substrates 141 are arranged substantially parallel in the short-side direction of the chassis 131.

The LEDs 142 are white LEDs (light-emitting diodes) that emit white light, for example, and a plurality thereof are respectively mounted on the three substrates 141. The plurality of LEDs 142 are arranged in a row in parallel so as to form a straight line along the long-side direction of the substrates 141, which are substantially rectangular in a plan view. The plurality of LEDs 142 emit light towards the respective diffusion lenses 143 above.

Three of the diffusion lenses 143 are respectively provided for the three substrates 141. The diffusion lenses 143 are arranged so as to cover the respective front sides of the LEDs 142, which are the light-emitting sides, in order to diffuse the light emitted from these LEDs 142. In order for the respective diffusion lenses 143 to completely cover the plurality of LEDs 142 mounted on one of the substrates 141, the diffusion lenses 143 have a bar shape extending along the long-side direction of the chassis 131 and are respectively shared among the plurality of LEDs 142.

The detailed configuration of the diffusion lenses 143 in a vertical cross-sectional view is at a right angle to the array direction of the LEDs 142 is similar to the configurations in Embodiments 1 to 3, and therefore, an explanation thereof will be omitted. The configuration of the diffusion lenses 143 can be adjusted such that the degree of light diffusion towards the direction forming a right angle with the array direction of the plurality of LEDs 142 (the short-side direction of the chassis 131) is larger than the degree of light diffusion towards the array direction of the plurality of LEDs 142 (the long-side direction of the chassis 131).

The reflective sheet 144 is arranged on the rear side of the LEDs 142, which is the front side of the substrate 141. The reflective sheet 144 is a sheet member that has a rectangular shape in a plan view and that covers the entire inner bottom surface 131a of the chassis 131. The reflective sheet 144 has cut-outs for the LEDs 142 and the substrates 141. The reflective sheet 144 reflects light from the LEDs 142, which has reached the chassis 131 side after being reflected by the bottom of the diffusion plate 132 or the like, back towards the emitting side of the LEDs 142, for example.

The diffusion plate 132, the prism sheet 133, and the lens sheet 134 are arranged so as to block the opening in the chassis 131, and to cover the light-emitting module 140 housed inside the chassis 131 from the liquid crystal display panel 120 side.

Among the diffusion plate 132, the prism sheet 133, and the lens sheet 134, the diffusion sheet 132 is arranged closest to the light-emitting module 140 and directly receives light emitted by the light-emitting module 140. The diffusion plate 132 is arranged such that the surface of the diffusion plate 132 where light from the light-emitting module 140 is incident is substantially parallel to the surface of the substrates 141 where the LEDs 142 are arranged. The diffusion plate 132 diffuses light that has been emitted from the LEDs 142 via the diffusion lenses 143 and spreads this light over the entire liquid crystal display panel 120.

The prism sheet 133 covers the top side of the diffusion plate 132. The prism sheet 133 has triangular prisms, for example, that extend in a linear fashion in one direction and are aligned in a direction that intersects the one direction in the sheet surface. The prism sheet 133 changes the radiating characteristics of light from the diffusion plate 132.

The lens sheet 134 covers the top side of the prism sheet 133. The lens sheet 134 has spread therein micro-particles that refract and disperse light. The lens sheet 134 suppresses differences in brightness that lead to uneven brightness without locally condensing the light from the prism sheet 133.

The illumination device 130 having this type of configuration emits substantially uniform planar light in which uneven brightness has been suppressed, and illuminates the rear surface of the liquid crystal display panel 120. The liquid crystal display panel 120 changes the transmittance of backlight passing through the liquid crystal on the basis of the image signal, and thus, a desired image is displayed on the display surface of the liquid crystal display panel 120.

As shown in FIG. 12, the panel holders 103 are arranged on the rear surface side of the periphery of the liquid crystal display panel 120. The panel holders 103 have a rectangular frame shape that fits into the front cover 101F and an opening on the inside thereof that is similar to the front opening on the front cover 101F. The liquid crystal display panel 120 is held between the panel holders 103 and the front cover 101F. The light from the illumination device 130 passes through the opening in the panel holders 103 to illuminate the liquid crystal display panel 120.

As shown in FIG. 12, the circuit substrates 104 are arranged on the rear surface side of the liquid crystal display device 110. A plurality of the circuit substrates 104 are fixed to the rear surface of the liquid crystal display device 110 through spacers 104a with a gap therebetween, for example. Each of the circuit substrates 104 functions as a power source circuit, television receiver circuit, LCD controller (controlling of the liquid crystal display panel 120), LED controller (controlling of the illumination device 130), video controller, or the like. The circuit substrates 104 are electrically connected to a power source plug (not shown), the liquid crystal display panel 120, the illumination device 130, and the like.

As described above, the illumination device 130 includes the plurality of LEDs 142 arranged in straight rows, and the diffusion lenses 143 that extend in a bar shape in accordance with the array direction of the plurality of LEDs 142 and that are respectively shared among the plurality of LEDs 142. With respect to the diffusion lenses 143, the degree of light diffusion towards the direction forming a right angle with the array direction of the plurality of LEDs 142 (the short-side direction of the chassis 131) is larger than the degree of light diffusion towards the array direction of the plurality of LEDs 142 (the long-side direction of the chassis 131). With this configuration, the illumination device 130 has one diffusion lens 143 each for diffusing light from the plurality of the respective LEDs 142 arranged in a linear row. In other words, the number of the diffusion lenses 143 to the number of the LEDs 142 can be greatly reduced in the liquid crystal display device 110 and the television receiver 100.

The illumination device 130 has three pairs of the plurality of LEDs 142 and the diffusion lenses 143 shared by the respective plurality of the LEDs 142. Due to this, when it is necessary illuminate a relatively large area in the direction at a right angle to the array direction of the plurality of LEDs 142 (the short-side direction of the chassis 131) as with the illumination device 130, it is possible to arrange the pairs of the plurality of LEDs 142 and the respective diffusion lenses 143 in the short-side direction of the chassis 131.

In this manner, according to the configurations of the above-mentioned embodiments of the present invention, it is possible to provide the liquid crystal display device 110 and television receiver 100 at a low-cost and with which suitable images and the like can be displayed.

Embodiments of the present invention were described above, but the scope of the present invention is not limited thereto, and can be implemented with various modifications without departing from the spirit thereof.

The dimensions relating to the configuration and arrangement of the base member 2, the diffusion cover 3, the substrates 4, the LEDs 5, and the diffusion lens 6, and the numerical values relating to the number of the LEDs 5 are not limited to the values described above, and other values may be used.

In the illumination device 1 in Embodiment 1, the pairs of the plurality of LEDs 5 and the single diffusion lens 6 may be increased in accordance with the size of the radial direction of the illumination device 1. In this case, it is preferable that the added pairs of the plurality of LEDs 5 and the single diffusion lens 6 be arranged on the outer radial side in accordance with the already arranged pairs of the plurality of LEDs 5 and the single diffusion lens 6.

INDUSTRIAL APPLICABILITY

The present invention can be applied to an illumination device that uses LEDs as a light source, for example. Examples of such an illumination device include ceiling lights, liquid crystal display devices, and the backlight of television receivers.

DESCRIPTION OF REFERENCE CHARACTERS 1 illumination device
2 base member
3 diffusion cover
4 substrate
5 LED (light source)
6 diffusion lens
6a housing recess
6b, 6e, 6k curved surface
6c, 6d, 6f, 6g, 6m, 6n substantially arced section
6h stray light recess
7 reflective sheet
8, 9 diffusion lens
100 television receiver
110 liquid crystal display device
120 liquid crystal display panel
130 illumination device
131 chassis
132 diffusion plate (diffusion cover)
140 light-emitting module
141 substrate
142 LED (light source)
143 diffusion lens
144 reflective sheet

The invention claimed is:
1. An illumination device, comprising:
a plurality of light sources arranged in a row; and
a diffusion lens that is disposed on a light-emitting side of the light sources in order to diffuse light emitted therefrom, the diffusion lens being disposed so as to follow an arrangement direction of the light sources to cover the plurality of these light sources,
wherein a degree of light diffusion of the diffusion lens at a right angle to the arrangement direction of the light sources is larger than a degree of light diffusion in the arrangement direction of the light sources,
wherein the diffusion lens has a housing recess that covers and houses the light sources, and a curved surface that is across from the housing recess and substantially protrudes outwards along a light-emitting direction of the light sources,
wherein, in a cross-section at a right angle to the arrangement direction of the light sources, the curved surface has substantially arced sections that protrude outwards, the substantially arced sections being respectively formed at two spots on the left and the right of a central axis line that extends in a direction normal to an emitting surface of the light sources, and
wherein, in the cross-section at a right angle to the arrangement direction of the light sources, respective centers of curvature of the two substantially arced sections of the curved surface are at mutually different distances from the emitting surface of the light sources or at mutually different distances from the central axis extending in the direction normal to the emitting surface of the light sources.
2. The illumination device according to claim 1,
wherein the diffusion lens has a stray light recess that is adjacent to the housing recess and that faces the curved surface, the stray light recess receding towards the curved surface.
3. The illumination device according to claim 1,
wherein a diffusion cover that diffuses light exiting from the diffusion lens is disposed on a light-exiting side of the diffusion lens.
4. The illumination device according to claim 1,
wherein a reflective sheet that reflects light emitted by the light sources is disposed on a side of the light sources opposite to the light-emitting side, the reflective sheet facing the light-emitting side of the light sources.
5. The illumination device according to claim 1,
wherein the plurality of light sources are arranged in a circular shape, and the diffusion lens has a ring shape.
6. The illumination device according to claim 1,
wherein the plurality of light sources are arranged in a straight line, and the diffusion lens has a bar shape.
7. The illumination device according to claim 1, further comprising:
a plurality of groups, each of the groups having the plurality of light sources and the diffusion lens that is shared among the plurality of light sources.
8. A liquid crystal display device, comprising:
the illumination device according to claim 1.
9. A television receiver, comprising:
the illumination device according to claim 1.

* * * * *